US012036650B2

(12) United States Patent
Tan et al.

(10) Patent No.: US 12,036,650 B2
(45) Date of Patent: Jul. 16, 2024

(54) FASTENER TOOL WITH LOCKING MECHANISM

(71) Applicant: TECHTRONIC CORDLESS GP, Anderson, SC (US)

(72) Inventors: Yingxiang Tan, Dongguan (CN); Hailing Lin, Dongguan (CN); Xi He, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 358 days.

(21) Appl. No.: 17/621,323

(22) PCT Filed: Nov. 29, 2019

(86) PCT No.: PCT/CN2019/121922
§ 371 (c)(1),
(2) Date: Dec. 21, 2021

(87) PCT Pub. No.: WO2021/102894
PCT Pub. Date: Jun. 3, 2021

(65) Prior Publication Data

US 2022/0395970 A1 Dec. 15, 2022

(51) Int. Cl.
*B25C 1/04* (2006.01)

(52) U.S. Cl.
CPC .................................... *B25C 1/047* (2013.01)

(58) Field of Classification Search
CPC .. B25C 1/047; B25C 1/06; B25C 1/04; B25C 1/041; B25C 1/008
USPC .......................................................... 227/130
See application file for complete search history.

(56) References Cited

U.S. PATENT DOCUMENTS

2018/0126528 A1* 5/2018 Pomeroy ................... B25C 5/13
2018/0147709 A1 5/2018 Masatoshi et al.
2018/0154505 A1 6/2018 Sato et al.

FOREIGN PATENT DOCUMENTS

CN 202250829 U 5/2012
CN 203272124 U 11/2013
CN 106065872 A * 11/2016 ............. F04D 27/00
CN 106065872 A 11/2016

(Continued)

OTHER PUBLICATIONS

Extended European Search Report for Application No. 19954338.0 dated Jul. 21, 2023 (9 pages).

(Continued)

*Primary Examiner* — Jacob A Smith
(74) *Attorney, Agent, or Firm* — Michael Best & Friedrich LLP

(57) ABSTRACT

A fastener tool which contains a motor, a drive mechanism connected to the motor and adapted to drive a piston, and a locking module. The locking module includes a rotating member coupled with the drive mechanism and adapted to rotate with a spindle and define a rotation axis; and a receiving member adapted to engage with the rotating member at and engaging portion. The rotating member includes a latch and a biasing member, wherein the biasing member moveably supports the latch in a direction substantially perpendicular to the rotation axis. Therefore, the locking module provides a locking mechanism that prevents back driving of the fastener tool that increases the lifespan and efficiency of the tool.

24 Claims, 5 Drawing Sheets

(56) References Cited

FOREIGN PATENT DOCUMENTS

| | | | |
|---|---|---|---|
| CN | 108068059 | A | 5/2018 |
| CN | 110450108 | A | 11/2019 |
| DE | 102010063964 | A1 | 6/2012 |
| EP | 2080593 | B1 | 4/2013 |
| EP | 3492223 | A1 | 6/2019 |
| JP | 2002119182 | A | 4/2002 |

OTHER PUBLICATIONS

International Search Report and Written Opinion for Application No. PCT/CN2019/121922 dated Aug. 28, 2020 (9 pages).

* cited by examiner

FASTENER TOOL WITH LOCKING MECHANISM

CROSS-REFERENCE TO RELATED APPLICATIONS

This application is a national phase filing under 35 U.S.C. § 371 of International Application No. PCT/CN2019/121922, filed Nov. 29, 2019, the entire contents of which is incorporated herein by reference.

FIELD OF INVENTION

This invention relates to power tools, and more particularly to fastener tools that are adapted to drive fasteners into workpieces.

BACKGROUND OF INVENTION

Fastener tools such as nail guns (a.k.a. nailers) are used to drive fasteners such as nails into a workpiece at a high speed.

Fastener tools may be vulnerable to back driving of the drive mechanism at the end of one striking cycle and before the start of the next striking cycle. Back driving can exert undue stress on the motor thereby causing a range of problems, from increasing latency time of the tool resulting in a diminished end-user experience, to short-term or long-term stress being exerted on the motor and ultimately damaging the fastener tool. Frequent or recurrent incidences of back driving can shorten the lifespan of the fastener tool and/or prolong the user handling time of the fastener tool, thereby negatively impacting the end user experience. Improved fastener tools are desired.

SUMMARY OF INVENTION

In the light of the foregoing background, it is an object of the present invention to provide a power tool which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a fastener tool which contains a motor, a drive mechanism connected to the motor and adapted to drive a piston; and a locking module. The locking module includes a rotating member and a receiving member. The rotating member is coupled with the drive mechanism and is adapted to rotate with a spindle, defining a rotation axis. The receiving member is adapted to engage with the rotating member at an engaging portion. The rotating member includes a latch and a biasing member, wherein the biasing member moveably supports the latch in a direction substantially perpendicular to the rotation axis.

Preferably, the rotating member and the receiving member are coplanar at least at the engaging portion.

In an exemplary embodiment, the biasing member biases the latch towards the receiving member.

Most preferably, the latch is continuously pivotable between a first position and a second position about a pivot axis parallel to the rotation axis when the rotating member rotates in a first direction.

Preferably, the latch locks with the receiving member when the when the rotating member rotates in a second direction such that the latch is locked in the first position.

In an exemplary embodiment, the latch defines a longitudinal direction and then the biasing member biases the latch from the longitudinal direction at a biasing angle of at least 10 degrees.

In a further exemplary embodiment, the latch defines a longitudinal direction and then the biasing member biases the latch from the longitudinal direction at a biasing angle of between 10 degrees and 20 degrees.

In an implementation, the biasing member is a coil spring.

In a further implementation, the rotating member comprises three said latches.

Preferably, the receiving member comprises repeating geometric features.

More preferably, each one of the repeating geometric features is asymmetric such that the rotating member is only rotatable in the first direction.

In an exemplary embodiment, the piston is accommodated in a high-pressure gas cylinder and suitable for a reciprocating motion within the high-pressure gas cylinder.

In another implementation, the piston is connected to a striking element suitable for striking a workpiece.

In a further exemplary embodiment, the drive mechanism comprises a blade fixed to the piston, and a gear coupled to the motor, the gear comprising a plurality of teeth adapted to engage with a plurality of lugs on the blade such that a rotation of the gear is transformed to a linear movement of the blade.

The present invention, in a further aspect, a fastener tool which includes a motor, a drive mechanism connected to the motor and adapted to drive a piston; and a locking module. The locking module includes a rotating member and a receiving member. The rotating member is coupled with the drive mechanism and is adapted to rotate with a spindle, defining a rotation axis. The receiving member is adapted to engage with the rotating member at an engaging portion. The fastener tool also includes a latch moveably supported by a biasing member on the rotating member. The latch and the biasing member move with the rotating member.

In an example embodiment, the rotating member and the receiving member are coplanar at least at the engaging portion.

In a further embodiment, the biasing member biases the latch towards the receiving member.

Preferably, the latch is continuously pivotable between a first position and a second position about a pivot axis parallel to the rotation axis when the rotating member rotates in a first direction.

In an example embodiment, the latch locks with the receiving member when the rotating member rotates in a second direction such that the latch is locked in the first position.

In an implementation, the latch defines a longitudinal direction and then the basing member biases the latch from the longitudinal direction at a biasing angle of between 10 degrees and 20 degrees.

In a further implementation, the biasing member is a coil spring.

In an example embodiment, the fastener tool includes three latches.

In another example embodiment, the receiving member includes repeating geometric features.

In yet another embodiment, each one of the repeating geometric features is asymmetric such that the rotating member is only rotatable in the first direction.

The embodiments of the present invention thus provide a fastener tool that is simple in construction, safe and reliable. The fastener tool includes a locking mechanism in the form of a locking module that is coupled with the drive mechanism that prevents back driving. The rotating member and the receiving member of the locking module are configured to permit the rotating member, and thus the drive mechanism, to rotate in a first direction. The rotating member is prevented from rotating in a second direction by the latch locking with the receiving member. The latch continuously pivoting between a first position and a second position facilitates the locking mechanism, wherein the biasing member biases the latch such that the latch may pivot towards or away from the receiving member. This locking mechanism advantageously allows for the latch to pivot inwards, or away from the receiving member, thus permitting rotation of the rotating member and drive mechanism during a drive cycle of the fastener tool, i.e. a nail gun, in a first direction and prevents rotation of the rotating member in a second direction, at the end of a drive cycle, as a result of the latch pivoting outwards, or towards the receiving member, such that the latch locks with the receiving member and cannot rotate.

This locking mechanism beneficially ensures the drive mechanism rotates only in one direction and prevents back driving at the end of one drive cycle, or strike cycle, and before the next strike cycle, due to reversed rotation of the drive mechanism that may occur as a result of a large reverse thrust in the pre-loading state of the fastener tool. This locking mechanism advantageously prevents back driving and hence increased stress being exerted on the motor and potentially damaging it, and/or increased latency time for an improved end-user experience.

The locking mechanism provides an improved fastener tool with reduced latency time. The biasing member and the pivoting latch ensure the locking mechanism is reliable with a longer lifespan. Also, the locking mechanism is configured such that reduced torque is needed to unlock the rotating member and the receiving member when the strike cycle restarts. Further, the striking cycle can be automatically repeated continuously. This allows the motor in the fastener tool to operate without the need for interference, allowing for rotation in a single direction at a constant speed.

Some of the embodiments of the invention provide further advantages that enhance the performance of fastener tools. For example, by further dividing the interior of a single cylinder into a plurality of cylinder chambers, the timing of release of high-pressure gas, that is, the release of the piston, can be precisely controlled, which is achieved by controlling the size of the gas passage between the cylinder chambers. In addition, some embodiments of the present invention also include a plurality of bearings clamped on two opposite surfaces of the drive blade so as to support the drive blade in a stable manner, so that the blade can only move in a straight-line direction.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

Figure 1:
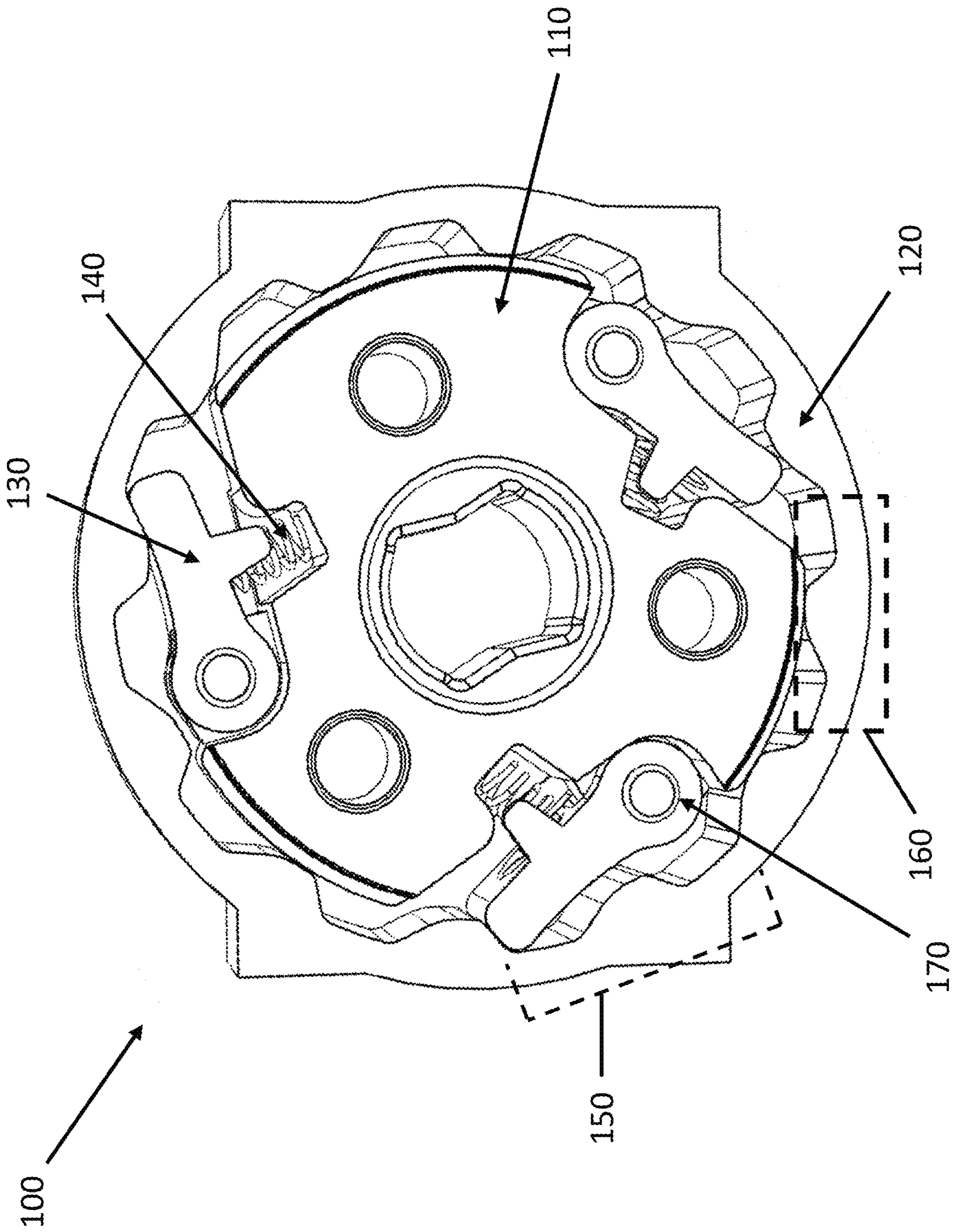
FIG. 1 shows a front perspective view of a locking module according to an exemplary embodiment of the present invention.

The following description is given by way of example only to illustrate preferred embodiments of the invention. In particular, the language and terminology used herein is for descriptive purposes only and is not intended to limit the scope or functionality of the invention. The invention may be employed in various combinations or embodiments utilizing various elements and means not explicitly described herein, but within the knowledge and skill of one skilled in the art.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

Terms such as “horizontal”, “vertical”, “upwards”, “downwards”, “above”, “below” and similar terms as used herein are for the purpose of describing the invention in its normal in-use orientation and are not intended to limit the invention to any particular orientation.

A problem that can occur during use of fastener tools, for example nail guns such as pneumatic nailers, is that during the pre-loading state, i.e. at the end of one strike cycle and before the start of the next strike cycle when the nail gun reaches a top dead center position, pressure from the gas spring can cause the drive mechanism to back drive through the gearing system. The back driving of the drive mechanism can exert undue stress on the motor and potentially damage the motor, a result that is both costly and inconvenient to a user of the nail gun. The back driving of the drive mechanism and motor also increases latency time during use of the nail gun whereby increased time is needed to account for the drive mechanism to rectify the reversal of the drive unit. Prolonged latency time decreases the efficiency of the nail gun and diminishes end user experience.

Some fastener tools in the prior art include frictional spindle locks in order to avoid the drive unit reversal. The spindle locks rely on frictional locking of the spindle by, for example, blocks to prevent the reversal in rotation. However, the frictional spindle lock structure has a number of shortcomings such as the frictional locking of the spindle slipping easily or wearing over time such that its effectiveness wanes over time, making the frictional spindle lock mechanism largely inefficient and not very useful due to its short lifespan and poor reliability. Another disadvantage of frictional spindle locks is that more torque is needed to unlock the rotating member when re-starting. It is an object of embodiments of the present invention to provide an improved locking mechanism for a fastener tool that achieves one-way rotation locking.

With reference to FIGS. 1 to 5, an exemplary embodiment provides a fastener tool 500 that includes a motor (not shown), a drive mechanism (not shown) coupled to the motor and adapted to drive a piston, and a locking module 100. The locking module 100 comprises a rotating member 110, coupled with the drive mechanism and adapted to rotate with a spindle 400 and defining a rotation axis 200, and a receiving member 120 adapted to engage with the rotating member 110 at an engaging portion 150.

Figure 2:
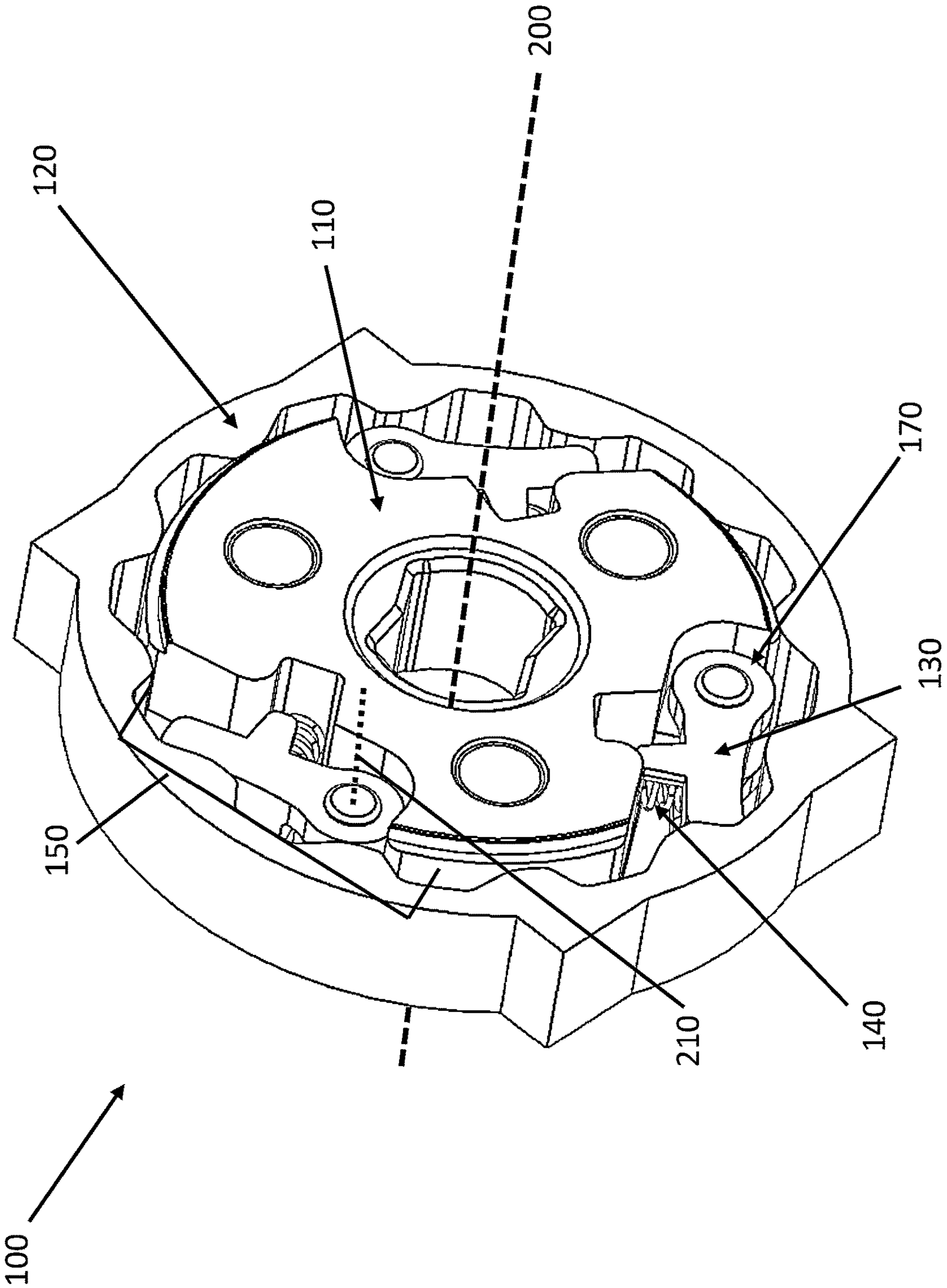
FIG. 2 shows a side perspective of the locking module in FIG. 1.
Figure 4:
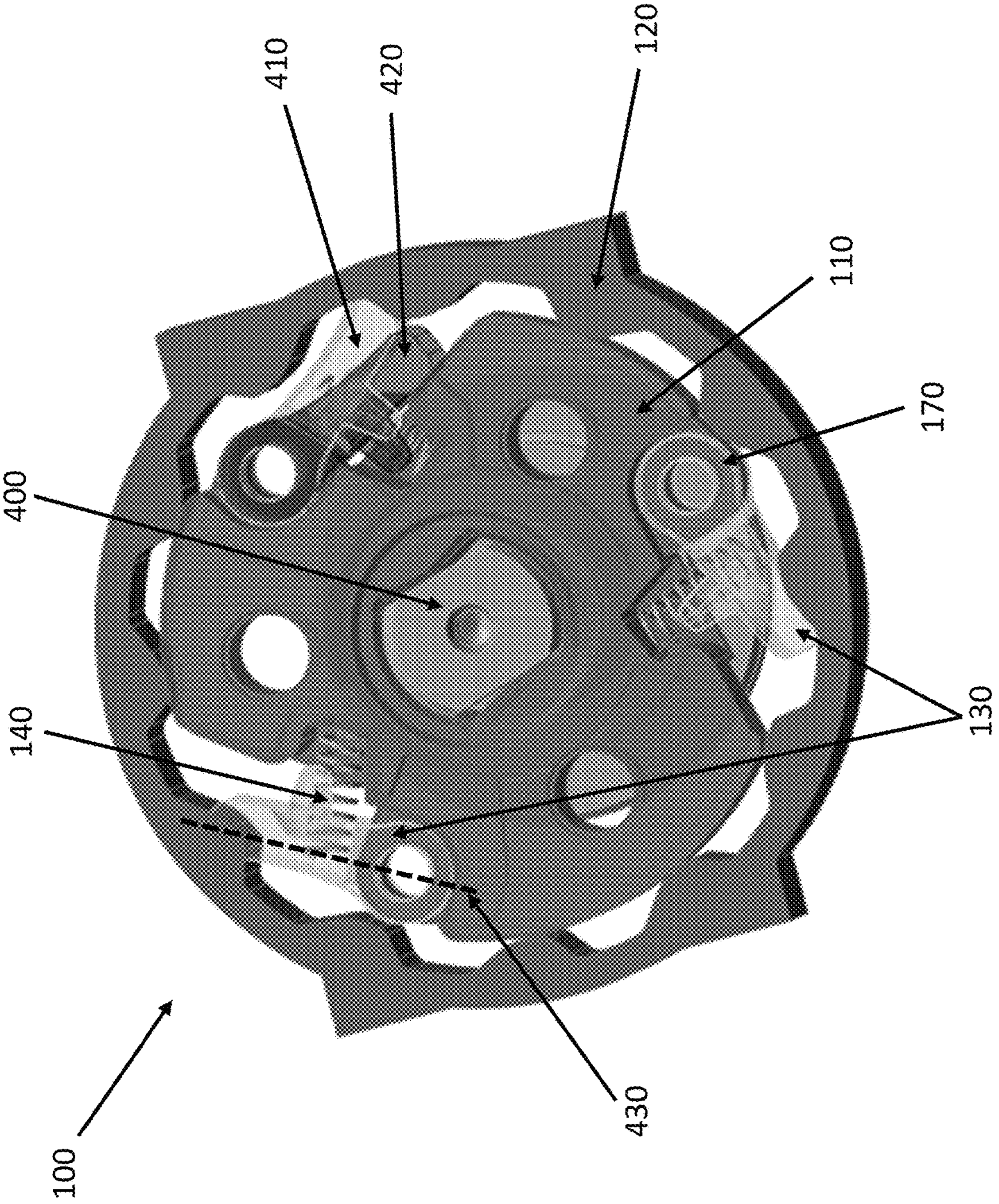
FIG. 4 shows a front perspective view of the locking module in FIG. 1 during operation of the fastener tool.

Referring to FIGS. 1-2 and 4, the locking module 100 includes a rotating member 110 that is coupled with the drive mechanism and rotates with a spindle 400. Preferably, the rotating member 110 surrounds the circumference of the spindle 400 such that the rotating member rotates with the spindle 400, thereby defining a rotation axis 200 about which the rotating member 110 and spindle 400 rotate. The rotating member 110 engages with a receiving member 120 at an engaging portion 150. The receiving member 120 surrounds or encircles the rotating member 110. In an exemplary embodiment, the receiving member 120 is a fixed structure. The receiving member 120 includes repeating geometric features 160 on an inner surface of the receiving member 120 closest to an outer surface of the rotating member 110. The repeating geometric features 160 act as cams that facilitate the locking mechanism of the locking module 100. Each of the repeating geometric features 160 is asymmetric such that the rotating member 110 is only rotatable in the first direction. The repeating geometric features 160 are spaced evenly along the circumference of the receiving member 120.

As can be seen from FIGS. 1-4, the rotating member 110 and the receiving member 120 are coplanar at least at the engaging portion 150.

The engaging portion 150 is a portion wherein the surfaces of the rotating member 110 and the receiving member 120 come into contact. The engaging portion 150 is the outer surface of the rotating member 110, i.e. the surface of the rotating member 110 that is farthest away from the spindle 400 and nearest to an inner surface of the receiving member 120, i.e. the inner surface of the receiving member 120 nearest to the outer surface of the rotating member 110 with repeating geometric features 160. The area of the engaging portion 150 may vary according to different phases, for example the engaging portion 150 may be greater, i.e. a greater area of surface contact or engagement between the rotating member 110 and the receiving member 120, during an initial phase, reflecting the start of a drive cycle of the fastener tool 500 and initial rotation of the spindle 400. The engaging portion 150 may then decrease as the rotational speed increases after the slower initial phase is passed and the area of surface contact or engagement between the rotating member 110 and the receiving member 120 decreases.

With reference to FIGS. 1 to 4, the rotating member 110 includes a latch 130 and a biasing member 140. The latch 130 and the biasing member 140 move with the rotating member 110. The biasing member 140 moveably supports the latch 130 in a biasing direction in a plane that is substantially perpendicular to the rotation axis 200. The biasing member 140 biases the latch 130, in a direction substantially perpendicular to the rotation axis 200, towards the receiving member 120. The biasing member 140 may be, for example, a coil spring.

The skilled person would appreciate that the term 'substantially perpendicular' as used herein may include, but is not limited to, an angle of 90 degrees to a given line, plane or surface. Accordingly, the term may include a range of 80 degrees to 100 degrees to a given line, plane, or surface.

As seen in FIGS. 1-4, the latch 130 is disposed along the outer periphery of the rotating member 110 such that the latch 130 completes the edges or profile of the circumference of the rotating member 110. The movement of the latch 130 adjusts the perimeter and/or profile of the rotating member 110. The latch 130 and the rotating member 110 may have different thicknesses.

With reference to FIGS. 2 and 4, the latch 130 continuously pivots between a first position 410 and a second position 420 about a pivot axis 210 when the rotating member 110 rotates in a first direction. In a preferred embodiment, the pivot axis 210 is parallel to the rotation axis 200. As previously noted, the movement of the latch 130 between the first position 410 and the second position 420 adjusts the perimeter of the rotating member 110. In the first position 410, the latch 130 is at a released position, wherein the latch 130 defines a longitudinal direction 430 and the latch 130 is biased away from the longitudinal direction 430 by the biasing member 140 and the latch 130 moves towards, or is extended towards, the receiving member 120. Conversely, in the second position 420 the latch 130 pivots from the first position 410 to the second, compressed, position 410, wherein the engagement of the latch 130 with the receiving member 120 in the engaging portion 150 causes the latch 130 to pivot inwards about the pivot axis 210 towards the rotating member 110 and spindle 400. Specifically, the latch 130 pivots inward from the first position 410 to the second position 420 when the latch 130 comes into contact with, and rides over, the repeating geometric features 160 of the receiving member 120. The continuous pivoting of the latch 130 from the first position 410 and the second position 420 advantageously allows continuous and uninterrupted rotation of the rotating member 110, and drive mechanism, in the first direction.

Figure 3:
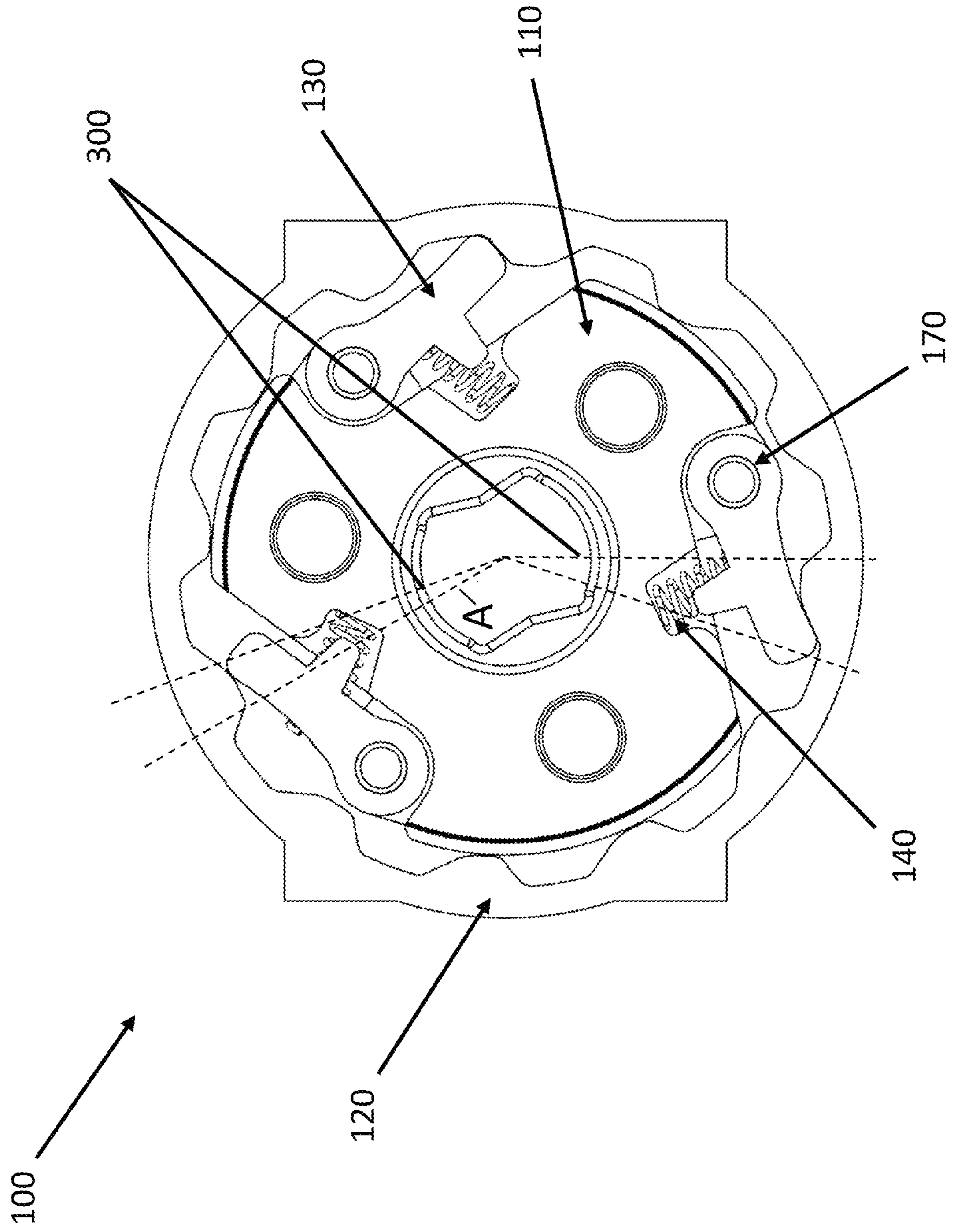
FIG. 3 shows a front view of the locking module in FIG. 1 illustrating the biasing angle.

A biasing angle 300 of the locking module 100 varies when the latch 130 is pivoting. With reference to FIG. 3, the latch 130 defines a longitudinal direction 430 and the biasing member 140 biases the latch 130 from the longitudinal direction 430 at a biasing angle 300 of at least 10 degrees (A). In an exemplary embodiment, the rotating member 110 includes at least one latch 130. The rotating member 110 may include a plurality of said latches 130. In a preferred embodiment, the rotating member 110 comprises three said latches 130. The malposition biasing angle 300 of the latch 130 advantageously reduces the chance of slippage between the latch 130 and the receiving member 120.

The latch 130 is coupled to the rotating member 110 such that the latch 130 can pivot in two different planes, facilitated by the biasing member 140. For example, as shown in FIG. 1, the latch 130 has a pivoting direction in a radial plane that is perpendicular to the rotation axis 200. The latch 130 may also have a pivoting direction in a different second plane to the radial plane, i.e. angled away from the radial plane, however the pivoting action of the latch 130 in the second plane may be less than the pivoting action in the radial plane. For example, the second plane may be angled within a range of 10-50 degrees of the radial plane. In a further example, the second plane may be angled 10-20 degrees of the radial plane. In an alternative embodiment, the second plane may be perpendicular to the radial plane.

With reference to FIG. 4, the locking module 100 of the present invention prevents back driving by allowing only one way rotation of the rotating member 110 in the first direction. When the rotating member 110 rotates in the second direction, the latch 130 in the first position 410 locks with the receiving member 120, specifically the repeating geometric features 160, or teeth 160 of the receiving member 120, such that the latch 130 is locked in the first position 410 and cannot rotate, thereby preventing the rotating member 110 from rotating in the second direction and actively preventing back driving.

Figure 5:
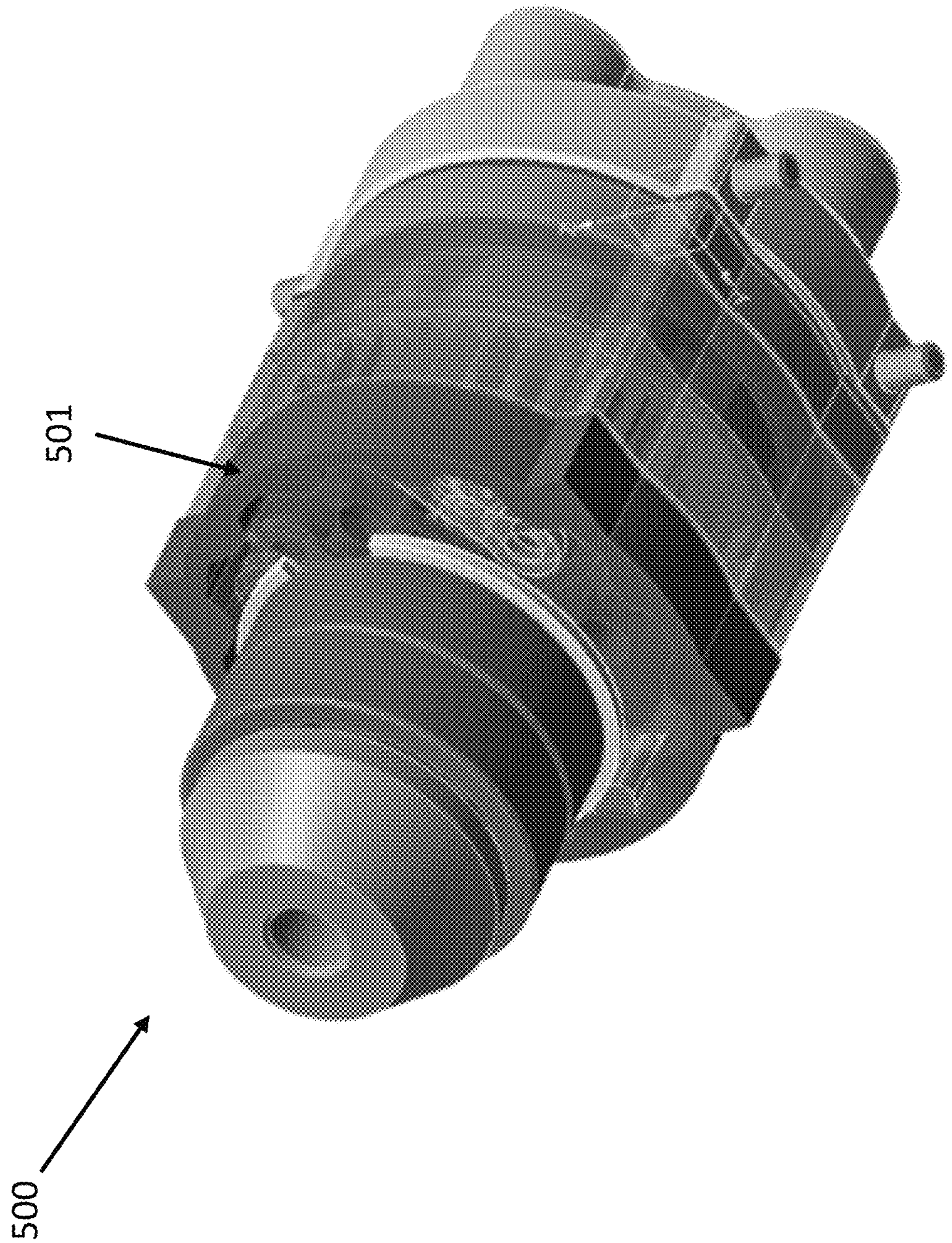
FIG. 5 shows a side perspective view of an arrangement of the locking module in the fastener tool according to an exemplary embodiment of the present invention.

In another exemplary embodiment as shown in FIG. 5, a locking module 501 similar to that in FIGS. 1-4 may be positioned near the gearbox of the fastener tool 500. when the fastener tool 500 reaches top dead center at the end of one drive cycle and rests before the next drive cycle begins, the pressure from, for example in the case of a pneumatic nailer, a gas spring can cause the drive mechanism to back drive through a gearing system. When back driving occurs, the drive mechanism and spindle 400 rotate in the second direction, i.e. opposite to the direction of rotation of the motor. This back driving phenomenon can harm the motor by exerting undue stress and/or also increase the latency time for use of the fastener tool 500 such that end user experience is diminished.

The fastener tool 500 with the locking mechanism as described provides an improved fastener tool with a locking module 501 that locks the spindle without friction. This superior locking mechanism additionally only requires a low torque for restarting rotation. The fastener tool 500 with the locking mechanism is advantageously more reliable with low to no incidence of accidental slippage.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, although the specific embodiment shown in FIG. 3 shows three latches 130 configured on the rotating member 110, those skilled in the art should realize that other variations of the number of latches 130 are possible. For example, there could be more or less than three latches 130 on the rotating member 110, and even one latch 130 is possible in some applications.

In addition, although the specific embodiment in FIG. 5 shows the locking module 100 positioned near the gearbox of the fastener tool 500, those skilled in the art will appreciate that the locking module 100 may be positioned elsewhere in the fastener tool 500, such as near the output side towards the bevel gear set, for example.

In a variation of the embodiment shown in FIGS. 1-4, the end of the latch 130 nearest the pivot 170 may optionally be a cam to facilitate the locking mechanism.

In a further variation of the embodiment shown in FIGS. 1-4, the receiving member 120 may be a clutch that can be selectively engaged or disengaged.

In a further variation of the embodiment shown in FIGS. 1-4, the spacing between the geometric features 160 may be varied or uneven.

Alternatively, the rotating member 110 and the latch 130 may be completely or partially coplanar.

In a further variation of the embodiment shown in FIGS. 1-4, the biasing angle 300 may be between 10 degrees and 20 degrees. In yet another embodiment, the biasing angle may be between 20 degrees and 30 degrees. In a preferred embodiment, the biasing angle is 10 degrees or 20 degrees.

In a further variation of the embodiment shown in FIGS. 1-4, when the rotating member 110 includes a plurality of said latches 130, the biasing angle 300 of all said latches 130 may be the same. Alternatively, each said latch 130 may have different biasing angles 300.

In an exemplary embodiment, the piston is accommodated in a high-pressure gas cylinder and suitable for a reciprocating motion within the high-pressure gas cylinder.

In a further exemplary embodiment, the piston is connected to a striking element suitable for striking a workpiece.

In one implementation, the drive mechanism comprises a blade fixed to the piston, and a gear coupled to the motor, the gear comprising a plurality of teeth adapted to engage with a plurality of lugs on the blade such that a rotation of the gear is transformed to a linear movement of the blade.

In addition, although the embodiments described above focus on pneumatic tools, one skilled in the art should realize that the invention can be used on other fastener tools with different types of energy storage unit instead of a gas spring. For example, the invention can also be applied to fastener tools with metal springs.

What is claimed is:

1. A fastener tool comprising:

a motor;

a drive mechanism connected to the motor and adapted to drive a piston; and a locking module comprising a rotating member coupled with the drive mechanism and adapted to rotate with a spindle and defining a rotation axis, and a receiving member adapted to engage with the rotating member at an engaging portion;

the rotating member comprising a latch and a biasing member, wherein the biasing member moveably supports the latch in a direction substantially perpendicular to the rotation axis.

2. The fastener tool of claim 1, wherein the rotating member and the receiving member are coplanar at least at the engaging portion.

3. The fastener tool of claim 1, wherein the biasing member biases the latch towards the receiving member.

4. The fastener tool of claim 1, wherein the latch is continuously pivotable between a first position and a second position about a pivot axis parallel to the rotation axis when the rotating member rotates in a first direction.

5. The fastener tool of claim 4, wherein the latch locks with the receiving member when the rotating member rotates in a second direction such that the latch is locked in the first position.

6. The fastener tool of claim 1, wherein the latch defines a longitudinal direction and then the biasing member biases the latch from the longitudinal direction at a biasing angle of at least 10 degrees.

7. The fastener tool of claim 1, wherein the latch defines a longitudinal direction and then the biasing member biases the latch from the longitudinal direction at a biasing angle of between 10 degrees and 20 degrees.

8. The fastener tool of claim 1, wherein the biasing member is a coil spring.

9. The fastener tool of claim 1, wherein the rotating member comprises three said latches.

10. The fastener tool of claim 1, wherein the receiving member comprises repeating geometric features.

11. The fastener tool of claim 4, wherein each one of the repeating geometric features are asymmetric such that the rotating member is only rotatable in the first direction.

12. The fastener tool of claim 1, wherein the piston is accommodated in a high-pressure gas cylinder and suitable for a reciprocating motion within the high-pressure gas cylinder.

13. The fastener tool of claim 1, wherein the piston is connected to a striking element suitable for striking a workpiece.

14. The fastener tool of claim 1, wherein the drive mechanism comprises a blade fixed to the piston, and a gear coupled to the motor, the gear comprising a plurality of teeth adapted to engage with a plurality of lugs on the blade such that a rotation of the gear is transformed to a linear movement of the blade.

15. A fastener tool comprising:

a motor;

a drive mechanism connected to the motor and adapted to drive a piston;

a locking module comprising a rotating member coupled with the drive mechanism and adapted to rotate with a spindle and defining a rotation axis, and a receiving member adapted to engage with the rotating member at an engaging portion; and a latch moveably supported by a biasing member on the rotating member;

wherein the latch and the biasing member are adapted to move with the rotating member.

16. The fastener tool of claim 15, wherein the rotating member and the receiving member are coplanar at least at the engaging portion.

17. The fastener tool of claim 15, wherein the biasing member biases the latch towards the receiving member.

18. The fastener tool of claim 15, wherein the latch is continuously pivotable between a first position and a second position about a pivot axis parallel to the rotation axis when the rotating member rotates in a first direction.

19. The fastener tool of claim 18, wherein the latch locks with the receiving member when the rotating member rotates in a second direction such that the latch is locked in the first position.

20. The fastener tool of claim 15, wherein the latch defines a longitudinal direction and then the biasing member biases the latch from the longitudinal direction at a biasing angle of between 10 degrees and 20 degrees.

21. The fastener tool of claim 15, wherein the biasing member is a coil spring.

22. The fastener tool of claim 15, wherein the fastener tool comprises three latches.

23. The fastener tool of claim 15, wherein the receiving member comprises repeating geometric features.

24. The fastener tool of claim 18, wherein each one of the repeating geometric features are asymmetric such that the rotating member is only rotatable in the first direction.

* * * * *